(12) United States Patent  
Wolff et al.

(10) Patent No.: US 6,709,998 B2  
(45) Date of Patent: Mar. 23, 2004

(54) LEAD-FREE OPTICAL HEAVY FLINT GLASSES

(75) Inventors: Silke Wolff, Hueckeswagen (DE); Ute Woelfel, Mainz (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/191,971

(22) Filed: Jul. 10, 2002

(65) Prior Publication Data

US 2003/0092555 A1 May 15, 2003

(30) Foreign Application Priority Data

Jul. 11, 2001 (DE) .......................... 101 33 763

(51) Int. Cl.$^7$ .................. C03C 3/062; C03C 3/064; C03C 3/097

(52) U.S. Cl. .................. 501/73; 501/77; 501/63; 501/72

(58) Field of Search .................. 501/68, 69, 70, 501/72, 73, 78, 63, 77

(56) References Cited

U.S. PATENT DOCUMENTS 4,526,874 A * 7/1985 Grabowski geb. Marszalek et al. ............ 501/77

FOREIGN PATENT DOCUMENTS

| JP | 53016718 A | * 2/1978 | ............ C03C/3/04 |
| JP | 55-126549 | 9/1980 | |

OTHER PUBLICATIONS

Derwent Abstract 1978–24254A, Abstract of JP 53–16718.*  
Abstract of JP 55–126549.

* cited by examiner

Primary Examiner—David Sample  
Assistant Examiner—Elizabeth A. Bolden  
(74) Attorney, Agent, or Firm—Millen, White, Zelano & Branigan, P.C.

(57) ABSTRACT

The invention relates to lead-free optical glasses which have refractive indices $n_d$ of between 1.65 and 1.80 and Abbe numbers $v_d$ of between 21 and 33 and possess the following composition (in % by weight, based on oxide): $SiO_2$ 27–40; $B_2O_3$ 0–<0.5; $Al_2O_3$ 0–6; $Na_2O$ 7–18; $K_2O$ 1–10; BaO 1–10; SrO 0–3; CaO 0.5–5; MgO 0–3; with BaO+SrO+CaO+MgO<15; $TiO_2$ 21–37; $ZrO_2$ 0–7; $Nb_2O_5$ 5–17; $WO_3$ 0.1–7.

10 Claims, No Drawings

LEAD-FREE OPTICAL HEAVY FLINT GLASSES

The invention relates to lead-free optical glasses which have refractive indices $n_d$ of between 1.65 and 1.80 and Abbe numbers $v_d$ of between 21 and 33. These glasses belong to the optical glass type consisting of the heavy flint glasses (HF).

Since, in recent years, the glass components PbO and $As_2O_3$ have been considered to be environmentally polluting in public discussions, the manufacturers of optical apparatuses also require PbO-free and preferably also $As_2O_3$-free glasses having the respective optical properties.

It is desirable to dispense with PbO also for the production of light glass parts, i.e. of glasses having a low density.

It is as a rule not possible to reproduce the desired optical and technical glass properties influenced by PbO by simply replacing lead oxide by one or more components. Instead, new developments or wide-ranging changes in the glass composition are necessary.

The patent literature already includes some publications in which lead-free glasses having optical values from said range are described. However, these glasses have a very wide range of disadvantages.

DE 32 164 51 A describes optical lightweight glasses having a refractive index $n_d$ of >1.70 and an Abbe number $v_d$ of $\geq 22$ and a density $\rho$ of $\leq 3.5$ g/cm$^3$. These glasses contain up to 3% by weight of $B_2O_3$, a component which is aggressive towards Pt. If such glasses are melted in Pt crucibles or if they come into contact with other Pt components, which would improve the homogeneity and low bubble count of the glasses, they have a higher level of Pt impurities, with the result that their transmittance is adversely affected.

U.S. Pat. No. 3,589,918 describes an optical glass for lens systems comprising the glass system $SiO_2$—$K_2O$—$TiO_2$—$Sb_2O_3$. The high $Sb_2O_3$ contents of up to 45% by weight in this glass make the glass susceptible to separation and heavy and adversely affect its transmittance so that it is not suitable for modern applications in optics.

JP 53-16718 A discloses glasses having high contents of divalent oxides (MO=MgO+CaO+SrO+BaO+ZnO 15–50% by weight) and relatively low contents of $TiO_2$ (1–25% by weight). These glasses have Abbe numbers of between 30 and 45. Owing to the high MO content, their stability to crystallization is low.

JP 52-25812 A discloses $TiO_2$- and $Nb_2O_5$-glasses whose compositions vary over a wide range. According to the examples, the glasses have very high (25–45% by weight) or very low (5% by weight) of $Nb_2O_5$ contents. The same applies to the MO content (21 and 30% by weight and 0–5% by weight, respectively). These glasses having $TiO_2$ contents of up to 50% by weight are also not sufficiently stable to crystallization for economical continuous production.

It is an object of the invention to provide lead-free optical glasses having a refractive index $n_d$ of between 1.65 and 1.80 and an Abbe number $v_d$ of between 21 and 33, which possess good melting and processing properties and have good chemical resistance, good stability to crystallization and a low density.

This object is achieved by glasses described in Patent claim 1.

The good fusibility meltability of the glasses is achieved by the balanced proportions of fluxes ($Na_2O$, $K_2O$) to glass formers ($SiO_2$+optionally $B_2O_3$, $Al_2O_3$) in relation to the poorly melting highly refractive components (MO (BaO, CaO+optionally SrO, MgO), $TiO_2$, $Nb_2O_5$, $WO_3$+optionally $ZrO_2$)

The glasses contain 27 to 40% by weight of the main glass former SiO2. In the case of higher proportions, the desired high refractive index would not be reached and the fusibility would deteriorate; in the case of lower proportions, the stability to crystallization and the chemical resistance would be reduced. An $SiO_2$ content of at least 29% by weight is preferred, particularly preferably of at least 31% by weight of $SiO_2$. A content of not more than 36% by weight is particularly preferred.

For further stabilization, the glasses may contain up to 6% by weight of $Al_2O_3$, preferably up to <3% by weight of $Al_2O_3$, and up to <0.5% by weight of $B_2O_3$. Higher proportions of glass formers would reduce the fusibility. Preferably, $Al_2O_3$ is dispensed with. It is a major advantage that the $B_2O_3$ content can remain limited to said low proportions, since the aggressiveness of the glass melt is thus reduced, so that glasses containing extremely small amounts of Pt impurities and hence having very high transmittances can be produced in Pt components.

In order to achieve the desired optical position of a heavy flint glass, relatively high proportions of highly refractive components are required. The proportion of the glass formers and of fluxes having a low refractive index ($Na_2O$, $K_2O$) is therefore limited. Preferably 69.5% by weight of $SiO_2$+$Al_2O_3$+$B_2O_3$+$Na_2O$ +$K_2O$ are not exceeded, and very particularly preferably the limit of this sum is max. 60.5% by weight.

In addition to the glass formers, the glasses contain a proportion of fluxes which is sufficient for good fusibility. Thus, they contain at least 8% by weight and not more than 28% by weight of $Na_2O$+$K_2O$, and in particular 7–18% by weight of $Na_2O$ and 1–10% by weight of $K_2O$. A flux content of 12–26% by weight with 9–16% by weight of $Na_2O$ and 3–10% by weight of $K_2O$ is preferred, and at least 14% by weight of $Na_2O$+$K_2O$ with 10–15% by weight of $Na_2O$ and 4–9% by weight of $K_2O$ are particularly preferred. A sum of $Na_2O$ and $K_2O$ of not more than 21% by weight is very particularly preferred.

The glasses contain the following highly refractive components:

They contain 1.5–<15% by weight of alkaline earth metal oxides, preferably 3.5–14, especially $\leq 11$, particularly preferably $\leq 10$, % by weight.

Specifically:

1–10% by weight of BaO, preferably 3–10, particularly preferably 3–8, % by weight 0.5–5% by weight of CaO, preferably 0.5–3% by weight 0–3% by weight of MgO, preferably 0–<2% by weight, preferably Mgo-free 0–3% by weight of Sro, preferably 0–<2% by weight, preferably SrO-free The proportion of alkaline earth metal oxide is limited to said maximum content since a further increase would be possible only by reducing the glass former and flux content and would lead to crystallization effects, particularly since the further components which increase the refractive index are comparatively good nucleating agents. Said minimum contents of the alkaline earth metal oxides are necessary in order to establish the high refractive index and to stabilize the chemical resistance.

The glasses contain 21–37% by weight of $TiO_2$, preferably 23–35, particularly preferably 26–33, % by weight.

The glasses furthermore contain 5–17% by weight of $Nb_2O_5$, preferably >5, especially 7–15, particularly preferably $\leq 12$, % by weight.

These two components form the basis of the high refractive index at the desired Abbe number. An increase in the TiO$_2$ content would reduce the Abbe number excessively and also excessively increase the tendency to crystallization. An increase in the Nb$_2$O$_5$ content would increase the Abbe number to a very excessive extent and slightly reduce the refractive index.

For stabilization to crystallization, the glasses may contain up to 7% by weight of ZrO$_2$, preferably <5% by weight. Preferably, the ZrO$_2$ content replaces a corresponding part of the TiO$_2$ content, so that preferably the maximum sum of TiO$_2$+ZrO$_2$ is 37% by weight, in particular 35% by weight.

A further increase of ZrO$_2$ would in turn lead to an increase in the tendency to crystallization; furthermore the optical position would be undesirably shifted.

By parallel use of different nucleating agents and crystal formers, namely TiO$_2$ in addition to Nb$_2$O$_5$ and optionally ZrO$_2$, the formation of defined crystals is impeded and it is possible to achieve the desired exceptional refractive index by means of high proportions of these components without adding lead.

An important component is WO$_3$. It is present in an amount of 0.1 to 7% by weight in the glass and, in addition to the fine adjustment of the optical position, serves for further reducing the tendency to crystallization by its spatial coordination, which is unusual in this glass system. This too impedes the formation of defined crystals. In this glass system, a higher WO$_3$ content would in turn undesirably shift the optical position. A WO$_3$ content of between 0.2 and 5% by weight is preferred, particularly preferably between 0.2 and 4% by weight.

In order to improve the glass quality, one or more refining agents known per se can be added in the customary amount to the mixture for refining the glass. Thus, the glass has a particularly good internal glass quality with respect to freedom from bubbles and freedom from stria.

If, instead of As$_2$O$_3$, for example, Sb$_2$O$_3$ is used as refining agent, preferably an amount of up to 1% by weight, which is possible without losses in respect of the glass quality, the glasses which are lead-free according to the invention are additionally arsenic-free.

The glasses may also contain, for example, up to 1% by weight of F$^-$ and/or up to 1% by weight of Cl$^-$. F$^-$ is added, for example, as KF or KHF$_2$. Cl$^-$ is added, for example, as NaCl.

The glasses from said composition range have refractive indices n$_d$ of between 1.65 and 1.80 and Abbe numbers v$_d$ of between 21 and 33. Glasses from the composition ranges stated in each case as being preferred have refractive indices of n$_d$ of between 1.68 and 1.79 and Abbe numbers v$_d$ of between 23 and 32. The refractive indices n$_d$ and the Abbe numbers v$_d$ of glasses from the ranges stated as being particularly preferred are between 1.70 and 1.79 and between 24 and 28.

The entire disclosure of all applications, patents and publications, cited herein and of corresponding German application No. 10133763.9, filed Jul. 11, 2001 are incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

Seven examples of glasses according to the invention were produced from customary raw materials by melting.

Table 2 shows the respective composition (in % by weight, based on oxide), the refractive index n$_d$, the Abbe number v$_d$, the partial dispersion in the blue range of the spectrum P$_{g,F}$ and the anomalous partial dispersion $\Delta$P$_{g,F}$, the density $\rho$[g/cm$^3$], the coefficient of thermal expansion $\alpha_{20/300}$ [10$^{-6}$/K] and the glass transition temperature T$_g$ [°C] of the glasses.

By way of explanation:

The partial dispersive power, the so-called relative partial dispersion, in the blue part of the spectrum is represented by the expression $$P_{g,F} = \frac{n_g - n_F}{n_F - n_c}.$$

By definition, the "normal line" obeys the equation $$P_{g,F} = 0.6438 - 0.001682 \cdot v_d$$

in the blue range of the spectrum.

Glasses whose partial dispersion lies on this line are referred to as "normal glasses".

In the case of glasses which have a dispersion behaviour deviating from "normal glasses", the ordinal difference $\Delta$P$_{g,F}$ by which the relevant P$_{g,F}$–v$_d$ point is shifted relative to the "normal line", is stated:

A coarse classification of these glasses having anomalous partial dispersion into two groups is usual, depending on whether P$_{g,F}$ is "above" (positive partial dispersion: $\Delta$P$_{g,F}$= pos.) or "below" (negative partial dispersion: $\Delta$P$_{g,F}$=neg.) the "normal line".

The glasses according to the invention were produced as follows: the raw materials for the oxides, preferably carbonates and nitrates, were weighed out. The refining agent or agents was or were added, and thorough mixing was then carried out. The glass mixture was melted at about 1350° C. in a continuous Pt melting unit, then refined at about 1400° C. and thoroughly homogenized. At a pouring temperature of about 1300° C., the glass was poured and was processed to give the desired dimensions.

Table 1 shows an example of melting.

TABLE 1

| Example of melting for 100 kg of glass (calculated) | | | |
|---|---|---|---|
| Oxide | % by weight | Raw material | Weight [kg] |
| SiO$_2$ | 35.0 | SiO$_2$ | 34.97 |
| Na$_2$O | 9.0 | Na$_2$CO$_3$ | 15.39 |
| K$_2$O | 5.0 | K$_2$CO$_3$ | 7.34 |
| CaO | 3.0 | CaCO$_3$ | 5.31 |
| BaO | 5.0 | Ba(NO$_3$)$_2$ | 0.34 |
| | | BaCO$_3$ | 6.18 |
| TiO$_2$ | 23.0 | TiO$_2$ | 23.11 |
| Nb$_2$O$_3$ | 15.0 | Nb$_2$O$_5$ | 15.00 |
| WO$_3$ | 5.0 | WO$_3$ | 5.00 |
| Sb$_2$O$_3$ | 0.1 | Sb$_2$O$_3$ | 0.10 |

The properties of the glasses obtained are shown in table 2, in example 3.

TABLE 2

Glass compositions (in % by weight, based on oxide) and important properties:

|  | 1 | 2 | 3 | 4 | 5 | 6 | 7 |
|---|---|---|---|---|---|---|---|
| $SiO_2$ | 29.0 | 40.0 | 35.0 | 35.1 | 34.0 | 35.0 | 39.8 |
| $B_2O_3$ |  |  |  | 0.4 | 0.4 |  | 0.2 |
| $Al_2O_3$ | 6.0 |  |  |  |  | 2.5 | 6.0 |
| $Na_2O$ | 16.0 | 9.0 | 9.0 | 12.0 | 11.1 | 13.0 | 12.3 |
| $K_2O$ | 10.0 | 3.0 | 5.0 | 3.0 | 6.0 | 8.0 | 5.0 |
| MgO | 1.0 |  |  |  |  |  |  |
| CaO | 2.0 | 1.0 | 3.0 | 0.5 | 2.2 | 1.0 | 0.5 |
| SrO | 1.0 |  |  |  |  |  |  |
| BaO | 3.0 | 3.0 | 5.0 | 10.0 | 6.5 | 4.0 | 3.0 |
| $TiO_2$ | 23.0 | 34.0 | 23.0 | 28.0 | 29.5 | 29.0 | 23.0 |
| $ZrO_2$ |  |  |  |  |  |  | 3.0 |
| $Nb_2O_5$ | 7.0 | 7.0 | 15.0 | 10.0 | 9.5 | 7.0 | 7.0 |
| $WO_3$ | 2.0 | 3.0 | 5.0 | 1.0 | 0.7 | 0.5 | 0.2 |
| $Sb_2O_3$ | 0.1 | 0.1 | 0.1 | 0.1 | 0.1 | 0.1 | 0.1 |
| $n_d$ | 1.6836 | 1.7816 | 1.7665 | 1.7700 | 1.7613 | 1.7251 | 1.6939 |
| $v_d$ | 31.26 | 23.82 | 26.49 | 26.18 | 25.98 | 27.96 | 29.54 |
| $P_{g,F}$ | 0.5964 | 0.6251 | 0.6128 | 0.6138 | 0.6126 | 0.6076 | 0.6056 |
| $\Delta P_{g,F}$ ($10^{-4}$) | 52 | 214 | 135 | 140 | 131 | 109 | 115 |
| $\rho$ [g/cm$^3$] | 2.96 | 3.04 | 3.21 | 3.19 | 3.08 | 2.99 | 2.92 |
| $\alpha_{20/300}$ [$10^{-6}$/K] | 13.5 | 8.4 | 9.5 | 10.0 | 10.5 | 11.3 | 9.8 |
| Tg [° C.] | 508 | 606 | 609 | 599 | 581 | 560 | 595 |

The glass composition range according to the invention offers a group of lead-free and, in a preferred embodiment, also $As_2O_3$-free optical glasses of glass type HF having said optical data, which have other properties improved compared with the known glasses. The freedom of the glasses from lead not only is advantageous because of the environmental protection concept discussed but also has a positive effect on their density and their glass transition temperature.

The glasses have the following advantages:

They have high chemical resistance; thus, they belong to the acid resistance class (ISO 8424) AR=2 or better and to the alkaline resistance class (ISO 10629) AR=2 or better, it being possible for the respective resistances to be 2.x or 1.x. The high chemical resistance of the glasses is important for their further processing, such as grinding and polishing.

The glasses have high stability to crystallization. It is thus possible to produce the glasses in relatively large melting units, for example in an optical trough.

The glasses are easy to melt and can be readily processed.

With at least 500° C., they have relatively high glass transition temperatures Tg.

Their density $\rho$ of not more than 3.4 g/cm$^3$ is very low. This is particularly remarkable since the low density is not realized through high $B_2O_3$ contents.

The transmittance of the glasses in the visible range of the spectrum is high. Thus, the spectral pure transmittance $\tau_i$ is at the wavelength $\lambda$=420 nm and a sample thickness of 25 mm ($\tau_{i420\ nm;\ 25\ mm}$>75%).

With these properties, especially with their optical position, their partial dispersion $P_{g,F}$ and their anomalous partial dispersion $\Delta P_{g,F}$ and their transmittance, the glasses are outstandingly suitable for use as optical elements (lenses, prisms) as well as optical fibres and image-transmitting fibres in the optical applications of imaging, projection, telecommunication and laser technology.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A lead-free optical glass having a refractive index $n_d$ of 1.65 to 1.80 and an Abbe number $v_d$ of 21 to 33 comprising in % by weight, based on oxide

| $SiO_2$ | 27–40 |
|---|---|
| $B_2O_3$ | 0–<0.5 |
| $Al_2O_3$ | 0–6 |
| $Na_2O$ | 7–18 |
| $K_2O$ | 1–10 |
| BaO | 1–10 |
| SrO | 0–3 |
| CaO | 0.5–5 |
| MgO | 0–3 |
| with BaO + SrO + CaO + MgO | <15 |
| $TiO_2$ | 21–37 |
| $ZrO_2$ | 0–7 |
| $Nb_2O_5$ | 5–17 |
| $WO_3$ | 0.1–7 | and optionally one or more refining agents.

2. A lead-free optical glass according to claim 1, having a refractive index $n_d$ of 1.68 to 1.79 and an Abbe number $v_d$ of 23 to 32, comprising in % by weight, based on oxide

| $SiO_2$ | 29–40 |
|---|---|
| $B_2O_3$ | 0–<0.5 |
| $Al_2O_3$ | 0–<3 |
| $Na_2O$ | 9–16 |
| $K_2O$ | 3–10 |
| BaO | 3–10 |
| SrO | 0–<2 |
| CaO | 0.5–3 |
| MgO | 0–<2 |
| with BaO + SrO + CaO + MgO | ≦14 |
| $TiO_2$ | 23–35 |

-continued

| | |
|---|---|
| $ZrO_2$ | 0–<5 |
| $Nb_2O_5$ | 7–15 |
| $WO_3$ | 0.2–5 | and optionally one or more refining agents.

3. A lead-free optical glass according to claim 1, having a refractive index $n_d$ of 1.70 to 1.79 and an Abbe number $v_d$ of 24 to 28, comprising in % by weight, based on oxide

| | |
|---|---|
| $SiO_2$ | 31–36 |
| $B_2O_3$ | 0–<0.5 |
| $Na_2O$ | 10–15 |
| $K_2O$ | 4–9 |
| BaO | 3–8 |
| CaO | 0.5–3 |
| with BaO + CaO | ≦10 |
| $TiO_2$ | 26–33 |
| $Nb_2O_5$ | 7–12 |
| $WO_3$ | 0.2–4 | and optionally one or more refining agents.

4. A lead-free optical glass according to claim 1, wherein the glass contains in % by weight

| | |
|---|---|
| Sb2O3 | 0–1 |
| Cl— | 0–1 |
| F— | 0–1 |

5. A lead-free optical glass according to claim 1, wherein the glass is free of arsenic oxide, with the exception of unavoidable impurities.

6. A lead-free optical glass according to claim 1, having a density v of not more than 3.4 g/cm$^3$ and a glass transition temperature Tg of ≦500° C.

7. A lead-free optical glass according to claim 1, wherein the refining agent is $As_2O_3$ or $Sb_2O_3$.

8. A lead-free optical glass according to claim 7 containing up to 1% by weight of $Sb_2O_3$.

9. A lens or prism comprising a lead-free optical glass according to claim 1.

10. An optical fiber or an image-transmitting fiber comprising a lead-free optical glass according to claim 1.

* * * * *